Patented June 24, 1947

2,422,671

UNITED STATES PATENT OFFICE 2,422,671

PROCESS FOR LOWERING THE MOLECULAR WEIGHT OF NONAROMATIC HYDROCARBONS

Vladimir Haensel and Vladimir N. Ipatieff, Riverside, Ill., assignors to Universal Oil Products Company, Chicago, Ill., a corporation of Delaware No Drawing. Application July 8, 1943,
Serial No. 493,866

15 Claims. (Cl. 260—683.6)

1

This invention relates to the preparation of a hydrocarbon having a shorter carbon chain from a non-aromatic hydrocarbon having a longer carbon chain, the hydrocarbon with longer chain containing at least one carbon atom more than those present in the hydrocarbon produced therefrom. More specifically, the invention is concerned with a process for treating a non-aromatic hydrocarbon in the presence of a particular type of catalyst to effect demethylation and to produce a saturated hydrocarbon of lower molecular weight.

An object of this invention is the production of lower molecular weight saturated hydrocarbons by the demethylation treatment of a non-aromatic hydrocarbon with hydrogen in the presence of a hydrogenating catalyst previously reduced at a temperature substantially higher than that employed during the demethylation treatment.

Another object of this invention is the treatment of a non-aromatic hydrocarbon with hydrogen in the presence of a nickel-containing catalyst previously reduced at a temperature of from about 800° to about 1100° F. to produce a saturated hydrocarbon of lower molecular weight and high antiknock value.

In one specific embodiment the present invention comprises a process for reacting a non-aromatic hydrocarbon containing at least six carbon atoms per molecule and hydrogen in the presence of a nickel-containing catalyst reduced at a temperature of from about 800° to about 1100° F. to effect selective demethylation and to produce a saturated hydrocarbon containing at least five carbon atoms per molecule.

Heretofore destructive hydrogenation methods have been utilized in producing gasoline from higher boiling oils in the presence of various hydrogenating catalysts. Such a process may be regarded as involving cracking of the higher boiling oils and hydrogenation of the resultant cracked products to form substantially saturated hydrocarbons boiling within the range of gasoline. The present process differs from the destructive hydrogenation treatment of the prior art in that it involves demethylation rather than cracking. The nature of the charging stock employed in the present type of treatment and the particular and specific conditions of operation necessary to effect selective demethylation also differ from those employed in the destructive hydrogenation treatments of the prior art.

By the term "selective demethylation" we mean the herein described treatment of a non-aromatic hydrocarbon with hydrogen in the presence of a hydrogenating catalyst whereby certain methyl groups are removed as methane in preference to other groups from a hydrocarbon being subjected to said treatment. The non-aromatic hydrocarbons herein referred to include paraffinic, olefinic, and naphthenic hydrocarbons.

Isohexane which has the formula

(CH₃)₂CH—CH₂—CH₂—CH₃ has 3 terminal methyl groups, 2 of which are combined with a carbon atom which is generally referred to as a tertiary carbon atom because of the fact that it is also combined chemically with a third alkyl group, namely a normal propyl group which contains the other terminal methyl group. Selective demethylation of isohexane in the presence of hydrogen and of a hydrogenating catalyst according to our invention produces methane and relatively large amounts of isopentane.

In a similar manner, selective demethylation of isopentane yields isobutane, and similar treatments of other paraffinic hydrocarbons result in the splitting off of methyl groups and the production of substantially saturated hydrocarbons of lower molecular weights than those of the hydrocarbons charged to the process.

In non-aromatic hydrocarbons it appears that the strength of a carbon-carbon bond between its different carbon atoms is dependent upon the structure of the hydrocarbon molecule. Under demethylating conditions in the presence of hydrogen and of a suitable catalyst the weakest bond in a given hydrocarbon structure containing a tertiary carbon atom generally appears to be the bond adjacent to the end of the longest and least branched alkyl group bound to said tertiary carbon atom. In general, the different carbon-carbon bonds in a paraffinic hydrocarbon molecule may be arranged in the following order of decreasing ease of demethylation: primary-secondary, primary-tertiary, and primary-quaternary. In this manner isopentane may lose methane and undergo conversion into isobutane; while isohexane, also known as 2-methylpentane, may lose one molecule of methane and form isopentane, or if 2 molecules of methane are lost successively from 2-methylpentane, the resultant product boiling higher than methane is isobutane. Similarly, a paraffinic hydrocarbon such as 2,3,4-trimethylpentane, which contains more than one tertiary carbon atom may lose one or more molecular proportions of methane and result in the formation of high antiknock, lower molecular weight paraffinic hydrocarbons such as 2,3-dimethylpentane and 2,3-dimethylbutane which are desirable as constituents of aviation gasoline.

We have also found that triptane, more exactly known as 2,2,3-trimethylbutane, is produced in substantial yield by treating 2,2,3-trimethylpentane according to the process of our invention. Triptane is also producible by our process from 2,3,3-trimethylpentane and from certain nonanes and other hydrocarbons containing a triptyl group. Such hydrocarbon starting materials containing triptyl groups have adjacent quaternary and tertiary carbon atoms, that is, one carbon atom is combined chemically with four other carbon atoms and one of said four carbon atoms is a tertiary carbon atom in that it is bound to the quaternary carbon atom, to two other carbon atoms, and to only one hydrogen atom.

The isomeric octane, 2,2,3-trimethylpentane, mentioned above is preferred as charging stock for the production of triptane but this octane is not the only aliphatic hydrocarbon which may be converted into triptane by demethylation. Similarly 2,3,3-trimethylpentane may also be demethylated to triptane, as is true also with certain highly branched nonanes, decanes, and other hydrocarbons. The general structure of paraffinic hydrocarbons containing a triptyl configuration of carbon atoms and convertible into triptane by demethylation may be indicated by the following formula in which $R^1$ to $R^6$ represent alkyl groups or hydrogen atoms, but with at least one of the R groups being a methyl or other alkyl group.

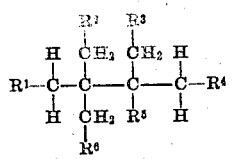

If the hydrocarbon represented by the above structural formula contains a total of $n$ carbon atoms in the groups $R^1$ to $R^6$, inclusive, the demethylation to triptane may be represented by the equation:

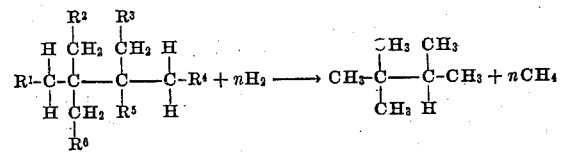

According to our invention it is possible to selectively remove methane from a hydrocarbon containing a triptyl configuration of carbon atoms so as to produce triptane which is a lower molecular weight hydrocarbon containing a quaternary carbon atom, a tertiary carbon atom, the other carbon atoms bound directly to said quaternary and tertiary carbon atoms, and the hydrogen atoms needed for a saturated hydrocarbon. This process effects the selective removal of methane usually from the longest and least branched alkyl group which is bound to the quaternary or tertiary carbon atoms of the hydrocarbon being treated. The hydrocarbon which is submitted to demethylation treatment may also contain more than one tertiary carbon atom.

Olefinic hydrocarbons such as straight and branched chain pentenes, hexenes, and higher olefins may also be subjected to selective demethylation to produce substantially paraffinic products having at least one less carbon atom per molecule than present in the olefinic hydrocarbon charged to the process. Olefinic hydrocarbons such as a 2-methylpentene may be reacted with hydrogen to effect demethylation and to obtain products similar to those obtainable from isohexane. In general, an olefinic hydrocarbon which is subjected to the process of the present invention undergoes substantially simultaneous hydrogenation and demethylation to produce a lower boiling saturated hydrocarbon and methane.

Other non-aromatic hydrocarbons convertible by the present process into saturated hydrocarbons of lower molecular weights are the naphthenic hydrocarbons including the alkyl cycloparaffins and cyclo-olefins and particularly cycloparaffins containing rings of 5 and/or 6 carbon atoms per molecule. Thus, alkyl cycloparaffins and alkyl cycloolefins which may be referred to by the terms "alkyl cyclanes" and "alkyl cyclenes," may be subjected to the demethylation treatment herein set forth to produce other alkyl cyclanes in general with shorter alkyl side chains although cyclanes with fewer side chains may sometimes be formed. Thus, ethyl cyclohexane is convertible into methyl cyclohexane and methane while other alkyl cycloparaffins and cycloolefins may be converted into saturated hydrocarbons of lower molecular weights.

Catalysts preferred for use in the process of this invention comprise those containing nickel and its oxides used as such or supported by a carrier such as alumina, silica, thoria, diatomaceous earth, crushed porcelain, or some other refractory material which has substantially no adverse affect on the demethylation reaction. Addition of reduced copper to supported nickel catalysts frequently produces composites with improved demethylating activities.

A highly active nickel catalyst which we have employed in the demethylation treatment of non-aromatic hydrocarbons contains approximately 66% by weight of total nickel, 30% of diatomaceous earth, and 4% of oxygen, the latter present with the nickel as nickel oxide. This catalyst is made by the general steps of suspending diatomaceous earth, also known as kieselguhr, in a dilute aqueous solution of nickel sulfate and then gradually adding thereto an excess of a hot saturated solution of sodium carbonate. The mixture of nickel sulfate solution and diatomaceous earth is agitated vigorously while the sodium carbonate solution is introduced thereto to form a precipitate which is then removed by filtration, washed, and dried. The dried mixture of nickel carbonate and diatomaceous earth so obtained is then heated to convert a substantial proportion of the nickel carbonate into nickel oxide, and the resultant material is then reduced as hereinafter described. In accordances with the process of this invention this reduction with hydrogen is carried out at a temperature in excess of about 700° F. but below about 1200° F. It is preferable to reduce the nickel-containing material at a temperature of from about 800° to about 1100° F. in order to obtain a demethylating catalyst of such activity that the demethylation reaction may be controlled readily. Accurate control of the demethylation temperature is sometimes difficult because of the exothermic nature of the reaction. When one methyl group is removed from one gram mole of hydrocarbon, approximately 12,500 calories of heat are evolved. As the evolution of about 16,900 calories accompanies the hydrogenation of one double bond per mole of hydrocarbon, it is evident that the removal of one methyl group per mole causes the evolution of approximately 75% as much heat of reaction as the hydrogenation reaction. However, if the demethylation reaction is permitted to proceed further until methane is the only product, the heat of reaction becomes 12,500 $(n-1)$ where $n$ is the number of carbon atoms per molecule in the original hydrocarbon. Thus if an octane is permitted to demethylate completely to methane, the heat of reaction is approximately 87,500 calories per mole. This heat of reaction is approximately 5.2 times the heat evolved upon hydrogenation of octene to octane. Therefore, it is apparent that if the catalyst used in demethylation, for example, of octane, is of such an active nature that excessive conversion or complete conversion to methane takes place readily, the catalyst will undergo a very rapid and excessive rise in temperature; and as a result of the high temperature, the catalyst will undergo a loss in demthylating activity. However, if the catalyst is of a less active nature, the demethylation reaction can be controlled and substantially stopped after only one or two methyl groups have been removed from the hydrocarbon charged to the process. In this case the heat of reaction is sufficiently low that it can be dissipated from the reaction zone fast enough so as to maintain a desired catalyst temperature, and so that relatively high conversions to lower molecular weight hydrocarbons can be attained.

We have found that a catalyst possessing the above-described readily controllable demethylation property can be prepared by treating a nickel-containing composite with hydrogen at a definite temperature higher than that used in demethylation reactions and prior to its use for promoting demethylation. Thus, for example, if a nickel-diatomaceous earth catalyst, prepared by the usual precipitation means which comprise reduction at approximately 700° F. followed by stabilization in a controlled amount of air, is used in promoting the demethylation of octanes to heptanes, this catalyst has a tendency to give complete demethylation. Consequently an excessive amount of heat is evolved so that it is often impossible to control the catalyst temperature. However, when a catalyst is prepared by the same series of steps except that, in addition to the reduction at 700° F. or instead of this reduction, the catalyst is treated with hydrogen to effect reduction at approximately 800° F. or at a higher temperature not in excess of about 1200° F., the resultant reduced catalyst has substantially no tendency to promote complete demethylation; but instead, it is possible to control and stop the demethylation at the desired stage.

Other catalysts which are also utilizable in this process, although not necessarily under the same conditions of operation, comprise other active hydrogenating catalysts including cobalt and iron and their oxides; platinum and palladium, preferably supported by carriers; and also oxides of metals of the left-hand columns of Groups V and VI of the Periodic Table including particularly vanadium, chromium, molybdenum, and tungsten.

The demethylation treatment of non-aromatic hydrocarbons may be carried out either in batch type operation or continuously in the presence of a catalyst of the type herein described at a temperature of from about 300° to about 700° F. and under a pressure of from substantially atmospheric inch. The particular operating conditions of temperature and pressure utilized in the present process are dependent upon the hydrocarbon or hydrocarbon mixture being treated, the composition and activity of the catalyst, the ratio of hydrogen to hydrocarbon, and other factors. Furthermore the different hydrocarbons which may be subjected to contact with hydrogen in the presence of the demethylating catalyst to separate methane from said hydrocarbons and to form substantially saturated hydrocarbons of lower molecular weights are not necessarily equivalent in their behaviours under conditions of selective demethylation.

Batch type treatment of non-aromatic hydrocarbons may be carried out in reactors or autoclaves of suitable design in which the hydrocarbon charged and catalyst may be contacted with hydrogen or a hydrogen-containing gas mixture under the desired conditions of operation and for a suitable length of time to effect the splitting out in the form of methane of one or more methyl groups.

The process may be operated continuously in a suitable chamber or tubular reactor containing the catalyst and through which the hydrocarbon charging stock is passed in the presence of hydrogen under desired conditions of temperature and pressure. Thus, the reaction products are discharged continuously from the reactor at substantially the rate at which they are charged thereto. The products of the selective demethylation treatment are fractionated by suitable means to separate the desired lower boiling hydrocarbons from the unconverted portion of the charged hydrocarbon material, and said unconverted portion of hydrocarbon material is recycled to commingle with the hydrocarbon material charged to the process.

The process may also be carried out continuously in the presence of powdered catalyst by use of the so-called fluid or fluidized fixed bed type of operation. For example, the hydrocarbon or hydrocarbon mixture and a processing gas such as hydrogen or a hydrogen-methane mixture are preheated to the chosen reaction temperature and the resultant heated mixture of processing gas and hydrocarbon vapors is charged to a reaction zone containing the powdered catalyst. In this zone the powdered catalyst may form a relatively dense phase or layer in the lower part of the reactor, and in the upper part of the reactor some of the powdered catalyst may be suspended in the mixture of gas and vapor. The reaction zone may also be provided with suitable means for introducing or removing heat such as heat exchange coils in order to maintain the reaction zone at a substantially constant temperature. The effluent hydrocarbon vapors and gases are directed from the reaction zone to a catalyst separating zone such as a cyclone separator or centrifugal separator in order to separate the finely powdered catalyst which is then returned to the reactor, generally at a point below the top of the catalyst bed contained therein. The mixture of hydrocarbon vapors and gas, so freed from finely divided catalyst, is then directed to a second separating zone in which the gases are separated from the liquid hydrocarbons. In some cases, the use of powdered catalyst in the so-called fluid or fluidized fixed bed type of operation simplifies the control of the reaction temperature so that substantial yields of demethylation products of high antiknock value can be obtemperature in the reaction zone due to the exothermic nature of the demethylation reaction.

We have found that the partial pressure of hydrogen has an important influence upon the demethylation of a non-aromatic hydrocarbon. Furthermore, we have observed that the speed and amount of demethylation is greatly affected by the partial pressure of hydrogen existing at various points in the catalyst zone. More specifically, we have found that for each partial pressure of hydrogen there is an optimum operating temperature for a given non-aromatic hydrocarbon undergoing reaction. In the case of the demethylation of branched chain octanes, a suitable operating temperature for demethylation to heptanes is defined as a temperature range at the lower limit of which the conversion is relatively low, such as from about 5 to about 10% per pass, while at the higher temperature range the reaction becomes too difficult to control because of the high conversion, such as 40 to 50% per pass, and the accompanying high evolution of heat. The optimum operating temperature decreases with decreasing partial pressure of hydrogen.

The following examples are given to illustrate the process of the invention, although with no intention of unduly limiting its generally broad scope.

*Example I*

A catalyst containing approximately 66% by weight of total nickel, 30% of diatomaceous earth, and 4% of oxygen in the form of nickel oxide was prepared by suspending diatomaceous earth in a dilute aqueous solution of nickel sulfate and then gradually adding thereto with vigorous agitation an excess of a hot saturated solution of sodium carbonate to form a precipitate consisting essentially of nickel carbonate mixed with diatomaceous earth. The resultant mixture of precipitate and diatomaceous earth was filtered from the mother liquor, washed, dried, and reduced with hydrogen to form an active catalyst.

An octane mixture consisting of 44% of 2,2,3-trimethylpentane and 56% of 2,3,4-trimethylpentane was passed continuously through a reactor packed with a pilled nickel-containing catalyst maintained at 485° F. and at a pressure of 600 pounds per square inch. Before use in this reaction, the catalyst had been reduced in a stream of hydrogen at 700° F. At the beginning of the run, which was made with a hydrogen to octane molar ratio of 1.7 and an octane charging rate of 0.8 volume per hour per volume of catalyst, the temperature of the catalyst had a tendency to rise excessively so that it was necessary to cool the reactor rapidly in order to maintain the desired catalyst temperature. During the run the reaction temperature was increased gradually to 510° F. and conversion into heptanes, hexanes, etc. of approximately 10% of the charged octane mixture was reached at the end of 2.7 hours when the run was temporarily discontinued. The run was continued on the following day at a catalyst temperature of 505° F. with an octane conversion of approximately 9%, but the catalyst temperature again started to increase excessively and necessitated cooling of the reactor. Approximately 1.5 hours later, while the run was continuing at about 11% conversion, another excessive rise of temperature occurred.

In a similar run a catalyst was used which after reduction at 700° F. was treated further with hydrogen at 800° F. This run was made at 520° F. and 600 pounds per square inch pressure using a hydrogen to hydrocarbon molar ratio of 1.6 while charging the octane mixture at a liquid space velocity of 0.68. The run was continued without excessive rise in temperature for 5 hours during which time a conversion of 24.9% per pass was observed. The converted material was found to contain 52% of a fraction containing approximately 83% of triptane and 17% of a mixture of 2,2- and 2,4-dimethylpentanes, 18% of 2,3-dimethylbutane, and 30% of 2,3-dimethylpentane.

*Example II*

A demethylation catalyst was prepared as follows: To 1100 gallons of steam condensate in a tank heated to 140° F. with open steam was added 1133 pounds of nickel sulfate hexahydrate. Then 121 pounds of diatomaceous earth (Johns-Manville Filtercel) were added to the solution, and the mixture was agitated for 0.5 hour at the above temperature. In another tank a second solution was prepared by dissolving 880 pounds of commercial soda ash (Na₂CO₃) in 220 gallons of steam condensate. The second solution was heated to 212° F. and was then added during a period of about 0.5 hour to the stirred slurry contained in the first tank. The mixing was continued throughout the addition and then for an additional period of 0.5 to 1.0 hour during which the temperature was maintained at 140° F. The slurry was pumped into a plate and frame filter-press, and the resultant filter cake was washed by alternate slurrying and filtration to remove sodium sulfate so that not more than 0.2% Na was present in the washed filter cake. The pressed cake was removed into a tray drier and dried for 24 hours at 265° to 300° F. so that the moisture content was reduced to between 10 and 20%. The dried material was ground to pass a 30 mesh screen, the ground material was mixed with 4% by weight of powdered graphite, and formed into ⅛ x ⅛ inch cylindrical pills. In order to dry the pills and to decompose the nickel carbonate into nickel oxide, the pills were loaded into a tower, and air was circulated through the tower while the temperature was increased to 700° F. After the pills had been heated at this temperature until no further water was evolved, the treatment with air was discontinued. This period of treatment with air was approximately 24 hours in length for a 2500 pound batch of pills. The tower containing the dried pills was purged with nitrogen, and a nitrogen stream was circulated through the tower while hydrogen was added thereto in such quantities so as to keep the temperature at a chosen reduction temperature of from about 800° to about 1100° F. until no further water was evolved. The heating was then discontinued, but the nitrogen circulation was continued; and when substantially atmospheric temperature was reached, air was added to the nitrogen in such quantities so that the catalyst temperature would not exceed a temperature of about 150° F. The peak temperature was measured, and when that temperature zone reached the bottom of the catalyst bed the stabilization was stopped and the finished catalyst was removed from the tower and was ready for use.

Some of the reduced catalysts were not given the last-described treatment with air which is commonly called a stabilization treatment before use in hydrocarbon demethylation runs.

In several demethylation runs some of the mixture of 2,2,3- and 2,3,4-trimethylphentanes treated in Example I was charged to a tubular reactor surrounded by an aluminum bronze block furnace and containing a nickel-Filtercel catalyst prepared as hereinabove described. In these runs the catalyst temperature was increased gradually while the mixture of hydrogen and trimethylpentane hydrocarbons was passed therethrough. At first, the hydrocarbons passed through the catalyst reactor without change but when the temperature reached a certain point, demethylation began. As the demethylation reaction was highly exothermic, and the catalyst temperature had a tendency to increase as the run progressed, care was needed to control the catalyst temperature and to prevent excessive demethylation.

In the following table, comparative results are given which were obtained in the presence of an excessively active catalyst which had been reduced at 700° F. and in the presence of one of our preferred catalysts, the one shown being reduced at a temperature of 800° F. In these runs the maximum controllable catalyst temperatures were used in order to obtain once-through yields as high as possible without uncontrollable rise of catalyst temperature and excessive demethylation. It is noted that higher yields of demethylation products were obtained per pass with catalysts reduced at 800° F. than with the catalyst reduced at 700° F. Also a relatively high ratio of hydrogen to hydrocarbon favored a higher conversion per pass.

| Run No. | 1 | 2 | 3 |
|---|---|---|---|
| Reduction temp. of catalyst, °F | 700 | 800 | 800 |
| Catalyst stabilized | Yes | No | No |
| Approximate 2,2,3-trimethylpentane content of charging stock, per cent by volume | 33 | 44 | 44 |
| Pressure, pounds per square inch | 600 | 600 | 600 |
| Hourly liquid space velocity | 0.8 | 0.7 | 0.7 |
| Molar ratio of hydrogen to hydrocarbon charging stock | 1.8 | 1.6 | 2.7 |
| Catalyst temp., °F | 505 | 520 | 530 |
| Recovered liquid, per cent by volume of charge | 96.5 | 89 | |
| Demethylated product, per cent by volume of recovered liquid obtained with temperature under good control | 10 | 24.9 | 45.4 |
| Fractional distillation of recovered liquid; fraction boiling: | | | |
| Below 129° F | } | 18.5 | 25.4 |
| 129°–158° F. (mainly 2,3-dimethylbutane) | | | |
| 158°–185° F. (triptane content approx. 83%) | | 51.8 | 52.5 |
| 185°–203° F. (mainly 2,3-dimethylpentane) | | 29.7 | 22.1 |

Other similar runs which were made at 100 pounds pressure gave considerably higher once-through yields of demethylation products than were obtained in each of the three runs made at 600 pounds pressure and referred to in the above table. These higher yields which were obtained at 100 pounds pressure were also obtained at lower temperatures than those needed to give good conversion at 600 pounds pressure. The following table gives comparative results obtained with catalysts which had been reduced at 800°, 1000°, and 1200° F. and then either stabilized by treating with air or used directly in demethylation runs.

The catalyst which was reduced at 1000° F. prior to use in the demethylation reaction was definitely superior to the catalyst which had been reduced at 800° F. The main advantage of the catalyst which had been reduced at 1000° F. was that the demethylation reaction could be carried out at a greater conversion per pass without attaining a difficultly controllable or uncontrollable operating temperature. For example, in run #5 where an average conversion of 54.5% was obtained, the catalyst temperature increased at one time during the run so that this temperature exceeded the temperaure of the reactor furnace by approximately 20° F. whereas during the remainder of the run this temperature differential was only approximately 15° F. It is estimated that the conversion was approximately 75% at the maximum temperature reached during this run.

The catalyst which had been reduced at 1200° F. was considerably less active than a similar catalyst which had been reduced at either 800° or 1000° F. The required operating temperature in order to obtain a 48% yield of demethylated products was about 550° F., this being an operating temperature approximately 100° F. higher than that required in the presence of catalysts reduced at 800° F. Furthermore, the catalyst which had been reduced at 1200° F. suffered a rapid decrease in activity during the demethylation runs made. For example, during an operating period of 6 hours in run #10 the yield of demethylated products decreased from an initial 48% to a final value of 35%.

In run #9, the results given in the preceding table indicate that the yield of demethylation products increased from 9% to 39% as the catalyst temperature was increased from 499° to 549° F. during a run of 6.5 hours duration.

The foregoing specification and examples indicate the character and value of the present process, although it is not intended that either section should limit unduly the generally broad scope of the invention.

We claim as our invention:

1. A process for treating a naphthenic hydrocarbon to produce a saturated hydrocarbon of lower molecular weight which comprises reacting said naphthenic hydrocarbon and hydrogen in the presence of a nickel-containing catalyst previously reduced at a temperature of from about 800° to about 1100° F.

2. A process for lowering the molecular weight of an aliphatic hydrocarbon containing a quaternary carbon atom to produce a saturated hydrocarbon of lower molecular weight also containing a quaternary carbon atom which comprises reacting said aliphatic hydrocarbon and hydrogen at a temperature of from about 300° to about 700° F. in the presence of a nickel-containing

| Run No. | 4 | 5 | 6 | 7 | 8 | 9 | 10 |
|---|---|---|---|---|---|---|---|
| Reduction temperature of catalyst | 800 | 1,000 | 1,000 | 1,000 | 1,000 | 1,200 | 1,200 |
| Catalyst stabilized | Yes | Yes | Yes | No | Yes | No | No |
| Approximate 2,2,3-trimethylpentane content of charging stock, per cent by volume | 33 | 49 | 49 | 49 | 49 | 49 | 49 |
| Pressure, pounds per square inch | 100 | 100 | 100 | 100 | 100 | 100 | 100 |
| Hourly liquid space velocity | 0.52 | 0.60 | 0.59 | 0.59 | 0.57 | 0.59 | 0.58 |
| Molar ratio of hydrogen to hydrocarbon charging stock | 2.3 | 2.3 | 3.2 | 2.5 | 4.7 | 2.3 | 2.3 |
| Catalyst temp., °F | 449 | 474 | 487 | 505 | 491 | 499–549 | 552 |
| Recovered liquid, per cent by volume of charge | 97.7 | 95.5 | 91.5 | 94.0 | 94.0 | 100 | 89.7 |
| Demethylated product, per cent by volume of recovered liquid obtained with temperature under good control | 38.2 | 54.5 | 62.9 | 51.9 | 66.8 | 9–39 | 48–35 |
| Fractional distillation of recovered liquid; fraction boiling: | | | | | | | |
| Below 129° F | } 18.5 | { 9.8 | 12.2 | 7.3 | 12.9 | | 12.9 |
| 129°–158° F. (mainly 2,3-dimethylbutane) | | 15.4 | 15.4 | 13.7 | 16.7 | | 14.8 |
| 158°–185° F. (triptane content approximately 83%) | 43.7 | 53.8 | 55.6 | 62.8 | 61.6 | | 54.2 | catalyst previously reduced at a temperature of from about 800° to about 1100° F.

3. A process for lowering the molecular weight of an aliphatic hydrocarbon containing adjacent quaternary and tertiary carbon atoms to produce a saturated hydrocarbon of lower molecular weight containing adjacent quaternary and tertiary carbon atoms which comprises reacting said aliphatic hydrocarbon and hydrogen at a temperature of from about 300° to about 700° F. in the presence of a nickel-containing catalyst previously reduced at a temperature of from about 800° to about 1100° F.

4. A process for lowering the molecular weight of a paraffinic hydrocarbon containing a quaternary carbon atom to produce a lower molecular weight paraffin also containing a quaternary carbon atom which comprises reacting said paraffinic hydrocarbon with hydrogen at a temperature of from about 300° F. to about 700° F. in the presence of a nickel-containing catalyst previously reduced with hydrogen at a temperature in the approximate range of 800–1100° F.

5. The process as defined in claim 4 further characterized in that said paraffinic hydrocarbon contains a tertiary carbon atom adjacent to the quaternary carbon atom.

6. A process for producing triptane which comprises reacting 2,2,3-trimethylpentane with hydrogen at a temperature of from about 300° F. to about 700° F. in the presence of a nickel-containing catalyst previously reduced with hydrogen at a temperature in the approximate range of 800–1100° F.

7. A process for producing triptane which comprises reacting 2,3,3-trimethylpentane with hydrogen at a temperature of from about 300° F. to about 700° F. in the presence of a nickel-containing catalyst previously reduced with hydrogen at a temperature in the approximate range of 800–1100° F.

8. A process for lowering the molecular weight of a saturated hydrocarbon containing an alkyl radical of more than one carbon atom, which comprises reacting said saturated hydrocarbon with hydrogen in the presence of a nickel-containing catalyst at a temperature of from about 300° F. to about 700° F. to replace with hydrogen a methyl group of said alkyl radical, said catalyst having been previously reduced with hydrogen at a temperature in the approximate range of 800–1100° F. to lower its catalytic activity for decomposing said saturated hydrocarbon, effecting the reaction of hydrogen with said saturated hydrocarbon under conditions regulated to prevent the splitting from the latter of an alkyl group of more than one carbon atom, and recovering the resultant lower molecular weight saturated hydrocarbon.

9. The process as defined in claim 8 further characterized in that said saturated hydrocarbon is a branched chain paraffin.

10. The process as defined in claim 8 further characterized in that said saturated hydrocarbon is a branched chain paraffin containing a quaternary carbon atom.

11. The process as defined in claim 8 further characterized in that said saturated hydrocarbon is a branched chain paraffin containing adjacent quaternary and tertiary carbon atoms, said alkyl radical being attached to one of the last-named carbon atoms.

12. The process as defined in claim 8 further characterized in that said saturated hydrocarbon is a branched chain paraffin containing adjacent quaternary and tertiary carbon atoms, said alkyl radical being attached to the tertiary carbon atom.

13. The process as defined in claim 8 further characterized in that said saturated hydrocarbon is an alkyl naphthene.

14. A process for producing triptane which comprises reacting 2,2,3-trimethylpentane with hydrogen at a temperature of from about 300° F. to about 700° F. in the presence of a nickel-containing catalyst previously reduced with hydrogen at a temperature in the approximate range of 800–1100° F., correlating the reaction temperature and hydrogen partial pressure to replace with hydrogen only the methyl group attached to the secondary carbon atom of said 2,2,3-trimethylpentane, and recovering the resultant 2,2,3-trimethylbutane.

15. A process for lowering the molecular weight of a saturated hydrocarbon containing an alkyl radical of more than one carbon atom, which comprises reacting said saturated hydrocarbon with hydrogen at a reaction temperature of from about 300° F. to about 700° F. in the presence of a nickel-containing catalyst previously reduced with hydrogen at a temperature in the approximate range of 800–1100° F., correlating said reaction temperature and the partial pressure of the hydrogen in the reaction of said hydrocarbon to replace with hydrogen at least one methyl group of said alkyl radical and to prevent the splitting from said saturated hydrocarbon of an alkyl group of more than one carbon atom, and recovering the resultant lower molecular weight saturated hydrocarbon.

VLADIMIR HAENSEL.
VLADIMIR N. IPATIEFF.

REFERENCES CITED

The following references are of record in the file of this patent:

UNITED STATES PATENTS

| Number | Name | Date |
|---|---|---|
| 2,214,463 | Ipatieff et al. | Sept. 10, 1940 |
| 2,276,103 | Seguy | Mar. 10, 1942 |
| 2,270,303 | Ipatieff | Jan. 20, 1942 |
| 2,259,862 | Ruys et al. | Oct. 21, 1941 |
| 2,303,118 | Frey | Nov. 24, 1942 |
| 2,181,640 | Deanesly et al. | Nov. 28, 1939 |

OTHER REFERENCES

Brown et al., Pub. (1937), pp. 289–298 IIme Congr. Mond. Petrole. (Copy in 260–683.6.)

Kazansky et al., Comptes Rendus (Doklady) de l'Academie des Sciences de l'URSS 1939, vol. XXV, No. 7, pp. 596 and 597. (Copy in 196–50.2.)

Waterman et al., Trans. of the Farady Soc., vol. XXXV, 985–988 (1939). (Div. 31.)